United States Patent

Berneth et al.

[11] Patent Number: 5,436,323
[45] Date of Patent: Jul. 25, 1995

[54] CATIONIC 1,3,4-THIADIAZOLE DYESTUFFS

[75] Inventors: Horst Berneth, Leverkusen; Werner Hartwich, Ko ln; Karl-Heinrich Lange, Burscheid, all of Germany

[73] Assignee: Bayer Aktiengesellschaft, Leverkusen, Germany

[21] Appl. No.: 86,599

[22] Filed: Jul. 1, 1993

[30] Foreign Application Priority Data

Jul. 7, 1992 [DE] Germany .......... 42 22 257.5

[51] Int. Cl.$^6$ .......... C09B 29/048; C09B 44/20; C09B 69/06; D06P 1/41
[52] U.S. Cl. .......... 534/607; 534/589; 534/707; 534/731; 534/774; 534/777; 534/795; 548/141; 548/138
[58] Field of Search .......... 534/607, 774, 777; 548/141, 138

[56] References Cited

U.S. PATENT DOCUMENTS

| | | | |
|---|---|---|---|
| 4,268,438 | 5/1981 | Fustenwerth | 534/795 |
| 4,500,715 | 2/1985 | Fustenwerth | 548/140 |
| 4,818,815 | 4/1989 | Moser | 534/607 |
| 5,208,325 | 5/1993 | Berneth et al. | 534/607 |

FOREIGN PATENT DOCUMENTS

| | | | |
|---|---|---|---|
| 0045402 | 2/1982 | European Pat. Off. | 534/607 |
| 0210139 | 1/1987 | European Pat. Off. | 534/607 |

*Primary Examiner*—Floyd D. Higel
*Attorney, Agent, or Firm*—William C. Gerstenzang; Sprung Horn Kramer & Woods

[57] ABSTRACT

Cationic 1,3,4-thiadiazolyldiphenylamine dyestuffs and corresponding anhydro bases, the dyestuffs having the formula (I)

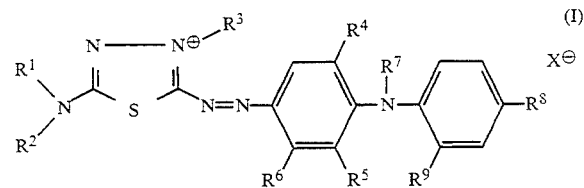

their preparation and their use, and materials dyed with such dyestuffs.

7 Claims, No Drawings

CATIONIC 1,3,4-THIADIAZOLE DYESTUFFS

The present invention relates to cationic thiadiazolyl-diphenylamine dyestuffs of the formula (I)

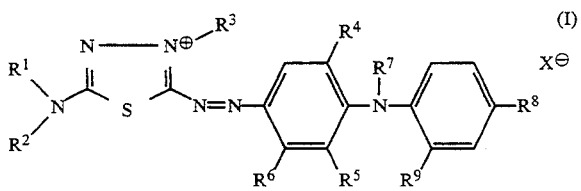

in which
- $R^1$ and $R^2$, independently of one another, denote hydrogen, alkyl, alkenyl, cycloalkyl, aralkyl or a heterocycle which may be bound via a methylene or ethylene bridge, it also being possible for $R^1$ and $R^2$ together with the nitrogen atom in between to form a heterocycle,
- $R^3$ denotes alkyl, alkenyl, cycloalkyl or aralkyl,
- $R^4$ and $R^5$, independently of one another, denote hydrogen, alkyl, alkoxy or halogen,
- $R^6$ denotes hydrogen, alkyl, alkoxy, aryloxy, arylamino, halogen, cyano, alkoxycarbonyl or nitro, it also being possible for
- $R^5$ and $R^6$ together to form a —CH=CH—CH=CH— bridge,
- $R^7$ denotes hydrogen, alkyl, cycloalkyl, alkenyl, aralkyl or aryl,
- $R^8$ and $R^9$, independently of one another, denote hydrogen, alkyl, alkoxy, aryloxy, halogen, cyano, alkoxycarbonyl, nitro or acylamino, it also being possible for
- $R^4$ together with $R^7$ to form a 2- or 3-membered carbon bridge which may be unsubstituted or substituted by 1 to 3 alkyl groups, or it also being possible for
- $R^4$ together with $R^9$ to form a direct bond or an oxygen bridge, and
- $X^\ominus$ denotes an anion, it being possible for any alkyl, alkenyl, cycloalkyl, aralkyl, aryl, alkoxy and heterocyclic radicals to be unsubstituted or substituted by non-ionic substituents, carboxyl groups, ammonium groups and/or pyridinium groups.

Preferably, at least one of the radicals $R^4$, $R^5$, $R^6$, $R^8$ and $R^9$ are not hydrogen or $R^5$ and $R^6$ together form a —CH=CH—CH=CH— bridge.

Examples of non-ionic substituents are non-dissociating substituents customary in dyestuff chemistry, such as cyano, hydroxyl, fluorine, chlorine, bromine, nitro, alkyl, monoalkylamino, dialkylamino, alkoxy, phenyl, acyloxy, acylamino, alkoxycarbonyl and alkoxycarbonyloxy.

Examples of alkyl radicals, including those in alkoxy and aralkyl radicals, are those having 1 to 8, preferably 1 to 4, C atoms. They may also be branched.

Examples of alkenyl radicals are those having 2 to 6, preferably 2 to 3, C atoms.

Examples of cycloalkyl radicals are those having 4 to 7, preferably 5 to 6, C atoms.

Halogen preferably represents fluorine, chlorine or bromine.

Aryl radicals, including those in aralkyl radicals, are preferably phenyl radicals which may be unsubstituted or substituted by 1 to 3 of the non-ionic substituents described above and/or by a carboxyl group.

Examples of heterocyclic radicals are thienyl, furyl and pyridyl, and their partially or completely hydrogenated derivatives. If desired, they can contain 1 to 3 of the non-ionic substituents described above.

Preferred anions are colourless organic and inorganic anions, for example fluoride, chloride, bromide, iodide, perchlorate, tetrafluoroborate, hydroxide, hydrogen sulphate, sulphate, dihydrogen phosphate, hydrogen phosphate, phosphate, hydrogen carbonate, carbonate, methyl sulphate, ethyl sulphate, cyanate, thiocyanate, tri- and tetrachlorozincate, tetrachloroferrate and anions of saturated or unsaturated aliphatic, cycloaliphatic, aromatic or heterocyclic carboxylic and sulphonic acids, such as formate, acetate, hydroxyacetate, cyanoacetate, propionate, hydroxypropionate, oxalate, citrate, lactate, tartrate, the anion of cyclohexanecarboxylic acid, phenylacetate, benzoate, the anion of nicotinic acid, methanesulphonate, ethanesulphonate, benzenesulphonate, chlorobenzenesulphonate, toluenesulphonate and hexafluorosilicate.

If the anions are polyvalent anions, for example sulphate or oxalate, $X^\ominus$ in formula (I) represents one equivalent of such a polyvalent anion.

Preference is given to cationic thiadiazolyldiphenylamine dyestuffs of the formula (I) in which
- $R^1$ and $R^2$, independently of one another, each denote a $C_1$–$C_8$-alkyl radical which is unsubstituted or substituted by hydroxyl, halogen, cyano, $C_1$–$C_4$-alkoxy, aminocarbonyl and/or $C_1$–$C_4$-alkoxycarbonyl, or denote allyl, cyclopentyl, cyclohexyl, a benzyl or phenethyl radical which is unsubstituted or substituted by halogen, cyano, $C_1$–$C_4$-alkyl and/or $C_1$–$C_4$-alkoxy, or denote a 1,1-dioxotetrahydrothienyl radical, tetrahydrofurylmethyl, pyridylmethyl or pyridylethyl radical, it also being possible for $R^2$ to denote hydrogen, or
- $R^1$ and $R^2$ together with the nitrogen atom in between denote a pyrrolidino, piperidino or morpholino radical which is unsubstituted or substituted by up to 4 methyl groups or denote a piperazino radical which is unsubstituted or substituted on nitrogen by methyl, ethyl, hydroxyethyl or aminoethyl,
- $R^3$ denotes $C_1$–$C_4$-alkyl which is unsubstituted or substituted by hydroxyl, halogen, cyano, $C_1$–$C_4$-alkoxy, aminocarbonyl and/or $C_1$–$C_4$-alkoxycarbonyl, or denotes allyl or a benzyl or phenethyl radical which is unsubstituted or substituted by halogen, $C_1$–$C_4$-alkyl and/or $C_1$–$C_4$-alkoxy,
- $R^4$ and $R^5$, independently of one another, denote hydrogen, $C_1$–$C_4$-alkyl, $C_1$–$C_4$-alkoxy or halogen,
- $R^6$ denotes hydrogen, $C_1$–$C_4$-alkyl, $C_1$–$C_4$-alkoxy, $C_6$–$C_{10}$-aryloxy, $C_6$–$C_{10}$-arylamino, halogen, cyano, $C_1$–$C_4$-alkoxycarbonyl or nitro, it also being possible for
- $R^5$ and $R^6$ together to form a —CH=CH—CH=CH— bridge,
- $R^7$ denotes hydrogen, $C_1$–$C_4$-alkyl which is unsubstituted or substituted by hydroxyl, halogen, cyano, $C_1$–$C_4$-alkoxy, aminocarbonyl and/or $C_1$–$C_4$-alkoxycarbonyl, or denotes allyl, cyclopentyl, cyclohexyl or a benzyl, phenethyl or phenyl radical, which is unsubstituted or substituted by halogen, $C_1$–$C_4$-alkyl and/or $C_1$–$C_4$-alkoxy,
- $R^8$ and $R^9$, independently of one another, each denote hydrogen, $C_1$–$C_4$-alkyl which is unsubstituted or substituted by hydroxyl, halogen, cyano or $C_1$–$C_4$- alkoxy, or denote $C_1$–$C_4$-alkoxy, $C_6$–$C_{10}$-aryloxy, halogen, cyano, $C_1$–$C_4$-alkoxycarbonyl, nitro or $C_1$–$C_4$-alkanoylamino, it also being possible for $R^4$ together with $R^7$ to denote a 2- or 3-membered carbon bridge which may be unsubstituted or substituted by 1 to 3 methyl and/or ethyl groups, or it also being possible for $R^4$ together with $R^9$ to form a direct bond or an oxygen bridge, and $X^\ominus$ denotes an anion.

Particular preference is given to cationic thiadiazolyldiphenylamine dyestuffs of the formula (I) in which $R^1$ and $R^2$, independently of one another, denote methyl, ethyl, propyl, butyl, methylpropyl, pentyl, methylbutyl, dimethylpropyl, hexyl, hydroxyethyl, hydroxypropyl, chloroethyl, cyanomethyl, cyanoethyl, cyanopropyl, methoxyethyl, ethoxyethyl, methoxypropyl, aminocarbonylmethyl, aminocarbonylethyl, methoxycarbonylmethyl, methoxycarbonylethyl, allyl, cyclohexyl, benzyl, phenethyl, methylbenzyl, chlorobenzyl, methoxybenzyl, 1,1-dioxotetrahydrothienyl, furfuryl, 2- or 4-pyridylmethyl or 2- or 4-pyridylethyl and $R^2$ can also denote hydrogen, or $R^1$ and $R^2$ together with the nitrogen atom in between denote pyrrolidino, piperidino, piperazino or morpholino which is unsubstituted or substituted on nitrogen by methyl, ethyl, hydroxyethyl or aminoethyl, $R^3$ denotes methyl, ethyl, propyl, butyl, hydroxyethyl, hydroxypropyl, hydroxybutyl, chloroethyl, cyanomethyl, cyanoethyl, cyanopropyl, methoxyethyl, ethoxyethyl, methoxypropyl, aminocarbonylethyl, methoxycarbonylethyl, ethoxycarbonylethyl, allyl, benzyl, phenethyl, methylbenzyl, chlorobenzyl or methoxybenzyl, $R^4$ and $R^5$, independently of one another, denote hydrogen, methyl, ethyl, methoxy, ethoxy or chlorine, $R^6$ denotes hydrogen, methyl, ethyl, methoxy, ethoxy, phenoxy, anilino, fluorine, chlorine, bromine, cyano, methoxycarbonyl, ethoxycarbonyl or nitro, it also being possible for $R^5$ and $R^6$ together to form a —CH=CH—CH=CH— bridge, $R^7$ denotes hydrogen, methyl, ethyl, propyl, butyl, hydroxyethyl, hydroxypropyl, chloroethyl, cyanomethyl, cyanoethyl, cyanopropyl, methoxyethyl, ethoxyethyl, aminocarbonylethyl, methoxycarbonylethyl, ethoxycarbonylethyl, allyl, benzyl, phenethyl, methylbenzyl, phenyl, chlorophenyl, methylphenyl or methoxyphenyl, $R^8$ and $R^9$, independently of one another, denote hydrogen, methyl, ethyl, methoxy, ethoxy, phenoxy, chlorine, cyano, methoxycarbonyl, nitro, acetylamino or propionylamino, or $R^4$ together with $R^7$ denotes a —CH$_2$—CH$_2$—, —CH$_2$—CH$_2$—CH$_2$—, —CH$_2$—CH(CH$_3$)— or —CH(CH$_3$)—CH$_2$—C(CH$_3$)$_2$— bridge, or $R^4$ together with $R^9$ denotes a direct bond or an oxygen bridge, and $X^\ominus$ denotes an anion.

Particular preference is also given to cationic thiadiazolyldiphenylamine dyestuffs of the formula (I) in which $R^1$ and $R^2$, independently of one another, denote methyl, ethyl, propyl, butyl, hydroxyethyl, hydroxypropyl, cyanoethyl, methoxyethyl or ethoxyethyl, or $R^1$ and $R^2$ together with the nitrogen atom in between denote morpholino, $R^3$ denotes methyl, ethyl, hydroxyethyl, hydroxypropyl or cyanoethyl, $R^4$ denotes methyl, methoxy, ethoxy or chlorine, $R^5$ denotes hydrogen, $R^6$ denotes hydrogen, methyl, chlorine, methoxy or cyano, or $R^5$ and $R^6$ together denote a —CH=CH—CH=CH— bridge, $R^7$ denotes hydrogen, methyl, hydroxyethyl, hydroxypropyl, cyanoethyl, $R^8$ and $R^9$, independently of one another, denote hydrogen, methyl, methoxy, chlorine, cyano, nitro or acetylamino, and $X^\ominus$ denotes an anion.

Very particular preference is given to cationic thiadiazolyldiphenylamine dyestuffs of the formula (I) in which $R^7$ denotes hydrogen and all other radicals have the meaning given in the text immediately above.

The present invention furthermore relates to anhydro bases of the formula (II)

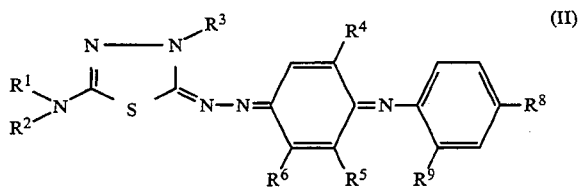

in which $R^1$ to $R^6$, $R^8$ and $R^9$ have the general, preferred and particularly preferred meaning given in formula (I).

The anhydro bases of the formula (II) can be obtained from dyestuffs of the formula (I) by reaction with bases in the presence of a solvent.

Examples of bases suitable for this reaction are hydroxides, such as sodium hydroxide, potassium hydroxide and calcium hydroxide, oxides, such as magnesium oxide, alcoholates, such as sodium methoxide, sodium ethoxide and sodium tert.-butoxide, amines, such as triethylamine, di- or triethanolamine, piperidine or pyridine or basic ion exchangers based on styrene/divinylbenzene.

Examples of suitable solvents are water, alcohols, such as methanol, ethanol, isopropanol, or glycols, ketones, such as acetone or butanone, amides such as dimethylformamide, dimethylacetamide, N-methyl-pyrrolidone or N-methylcaprolactam, nitriles, such as acetonitrile and 3-hydroxypropionitrile, sulphoxides, such as dimethyl sulphoxide, sulphones, such as sulpholane and dimethyl sulphone, or mixtures thereof.

The anhydro bases of the formula (II) are suitable intermediates for the preparation of the dyestuffs of the formula (I) in which $R^7$ denotes hydrogen and which contain those anions $X^\ominus$ which cannot or only with great difficulty be introduced by one of the preparation processes for the dyestuffs of the formula (I) described below. In this manner, it is possible to prepare dyestuffs of the formula (I) which by varying the anion $X^\ominus$, are given specific properties, for example better solubility and/or better suitability for the preparation of liquid formulations. To this end, anhydro bases of the formula (II) can be reacted with the acid of the formula HX whose anion is to be introduced. The reaction can, if desired, be carried out in the presence of a solvent and with cooling, at room temperature or at temperatures up to the boiling point of the medium.

Examples of solvents can be an excess of the acid HX, water, glycols, such as ethylene glycol or propylene glycol, amides, such as ε-caprolactam, nitriles such as hydroxypropionitrile, the solvents listed above for the preparation of the anhydro bases, or mixtures thereof.

Dyestuffs of the formula (I) thus prepared either precipitate from the reaction mixture or produce therein a stable solution.

The anhydro bases of the formula (II) themselves are also suitable for the dyeing of polyester fibres and fabrics and as dyestuffs for sublimation transfer printing, such as described, for example, in EP-A 0,384,040.

The present invention furthermore relates to a process for the preparation of cationic thiadiazolyldiphenylamine dyestuffs of the formula (I), which process is characterised in that 2-amino-1,3,4-thiadiazoles of the formula (III)

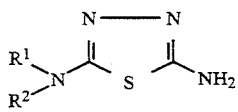
(III)

in which
R$^1$ and R$^2$ have the general, preferred and particularly preferred meaning given in formula (I), are diazotised, the resulting diazotised compounds are coupled onto diphenylamine derivatives of the formula (IV)

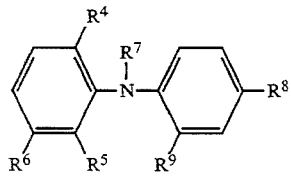
(IV)

in which
R$^4$ to R$^9$ have the general, preferred and particularly preferred meaning given in formula (I),
and the products are then quaternised with compounds of the formula (V)

R$^3$X  (V)

in which R$^3$ and X have the general, preferred and particularly preferred meaning given in formula (I), or precursors thereof.

The 2-amino-1,3,4-thiadiazoles of the formula (III) are disclosed, for example, in DE-A 2,811,258 or obtainable analogously thereto. The diphenylamine derivatives of the formula (IV) are disclosed, for example, in Houben-Weyl, Methoden der organischen Chemie (Methods of Organic Chemistry), Volume XI/1 or obtainable analogously thereto.

The present invention additionally relates to a further process for the preparation of cationic thiadiazolyldiphenylamine dyestuffs of the formula (I), which process is characterised in that dyestuffs of the formula (VI)

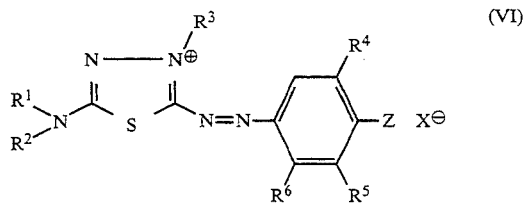
(VI)

in which
R$^1$ to R$^6$ and X$^\ominus$ have the general, preferred and particularly preferred meaning given in formula (I) and
Z represents halogen, hydroxyl, alkoxy, cycloalkoxy, aryloxy, amino, dialkylamino, acyloxy or acylamino,
are reacted with amines of the formula (VII)

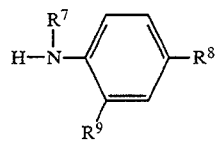
(VII)

in which
R$^7$ to R$^9$ have the general, preferred and particularly preferred meaning given in formula (I).

In formula (VI), Z preferably represents fluorine, chlorine, bromine, hydroxyl, C$_1$–C$_4$-alkoxy, C$_5$–C$_7$-cycloalkoxy, C$_6$–C$_{10}$-aryloxy, NR'R'', C$_1$–C$_6$-alkanoyloxy, C$_6$–C$_{10}$-aroyloxy, C$_1$–C$_6$-alkanesulphonyloxy, C$_6$–C$_{10}$-arylsulphonyloxy, C$_1$–C$_6$-alkanoylamino, C$_6$–C$_{10}$-aroylamino, C$_1$–C$_6$-alkylsulphonylamino or C$_6$–C$_{10}$-arylsulphonylamino and R' and R'', independently of one another, represent hydrogen or C$_1$–C$_6$-alkyl.

Compounds of the formula (VI) can be obtained, for example, by diazotising 2-amino-1,3,4-thiadiazoles of the formula (III), coupling onto a benzene derivative of the formula (VIII)

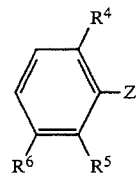
(VIII)

in which
R$^4$ to R$^6$ have the general, preferred and particularly preferred meaning given in formula (I) and
Z has the general and preferred meaning given in formula (VI),
and optionally, when Z represents hydroxyl or amino, acylating or sulphonylating with C$_1$–C$_6$-aliphatic or C$_6$–C$_{10}$-aromatic carboxylic anhydrides or carbonyl chlorides or sulphonyl chlorides,
and then quaternising with compounds of the formula (V).

The diazotisations mentioned can be carried out in a manner known per se, for example using nitrosylsulphuric acid in 80 to 90% strength by weight phosphoric acid or in mixtures of such phosphoric acids with acetic acid, propionic acid and/or sulphuric acid or using sodium nitrite in aqueous mineral acid, for example hydrochloric acid.

The couplings mentioned can also be carried out in a manner known per se, for example in an acidic medium, which may be aqueous or aqueous-organic.

The diazotisations and couplings can also be carried out simultaneously by other processes known per se, for example by joint reaction of compounds of the formula (III) and compounds of the formula (IV) in an acidic medium with, for example, sodium nitrite. Examples of suitable acidic media are aqueous mineral acids or organic acids or mixtures thereof, examples of suitable mineral acids being hydrochloric acid, sulphuric acid and phosphoric acid and examples of suitable organic acids being formic acid, acetic acid or propionic acid. Carbon dioxide liquefied under pressure can also serve as the acidic medium.

Suitable quaternising agents are those of the formula (V) and those which, under the reaction conditions, formally give compounds of the formula (V). Examples are alkyl halides, halogenoacetamides, β-halogenopropionitriles, halogenohydrins, alkylene oxides, alkyl esters of sulphuric acid, alkyl esters of organic sulphonic acids, nitriles, amides and esters of α,β-unsaturated carboxylic acids, alkoxyalkyl halides and vinylpyridines. Examples which may be mentioned are: methyl chloride, methyl bromide, methyl iodide, benzyl chloride, benzyl bromide, chloroacetamide, β-chloropropionitrile, ethylene chlorohydrin, dimethyl sulphate, diethyl sulphate, methyl benzenesulphonate, ethyl benzenesulphonate, methyl toluenesulphonate, ethyl toluenesulphonate, propyl toluenesulphonate, allyl chloride, allyl bromide, ethylene oxide, propylene oxide, acrylonitrile, acrylic acid, acrylamide, methyl acrylate, 2- and 4-vinylpyridine, sulpholene (=1,1-dioxo-2,5-dihydrothiophene), epichlorohydrin, styrene oxide, dimethyl methylphosphonate and allyl phosphate.

The quaternisations mentioned can take place, for example, in an inert organic solvent, in water or in mixtures thereof, it being possible, if desired, to add acid-binding agents, such as magnesium oxide, sodium carbonate, sodium bicarbonate, calcium carbonate or sodium acetate. Examples of suitable organic solvents are hydrocarbons, chlorinated hydrocarbons, nitroparaffins, nitriles, amides, carboxylic acids, carboxylic anhydrides, ketones and dialkyl sulphoxides, such as benzene, toluene, tetrachloroethane, mono- and dichlorobenzene, nitrobenzene, acetonitrile, propionitrile, dimethylformamide, N-methylpyrrolidone, acetic acid, propionic acid, lactic acid, acetic anhydride, acetone, butanone and dimethyl sulphoxide. Reaction of the dyestuffs of the formula (VI) with amines of the formula (VII) can also take place in organic solvents, in water or in mixtures thereof. Suitable solvents are the ones described above. If desired, the reaction can be carried out with an excess of the amine of the formula (VII) at temperatures of, for example, between 0° and 100° C., preferably those between 10° and 50° C.

The resulting dyestuffs of the formula (I) either precipitate directly from the solvents and can be isolated, for example, by filtering them off or, if water-miscible solvents are used, they can be obtained as solid products which can be filtered off by diluting them with water and adding water-soluble salts, such as sodium chloride or potassium chloride, if appropriate in the presence of zinc chloride or iron chloride.

The dyestuffs according to the invention of the formula (I) are highly suitable for the dyeing and printing of cationically dyeable fibres, preferably of polymers and copolymers of acrylonitrile and dicyanoethylene, and of acid-modified polyamide and polyester fibres, producing hues having good fastness properties. The dyestuffs can also be used for the dyeing and printing of tanned cellulose materials, paper, silk and leather. They are furthermore suitable for the production of writing fluids, stamping fluids, ballpoint pen pastes and inks for the ink-jet process and can also be used in flexographic printing.

Dyeing of, for example, polymers and copolymers of acrylonitrile can take place, for example, from a weakly acidic liquor, in which the dyebath is preferably entered at 40° to 60° C. and dyeing is carried out at the boiling temperature. It is also possible to carry out dyeing under pressure at temperatures above 100° C. Moreover, the dyestuffs according to the invention can be used for producing spinning solutions for the dyeing of polyacrylonitrile-containing fibres. The dyestuffs according to the invention have good stability in the dye bath.

The dyeings obtained with the dyestuffs of the formula (I) according to the invention on polyacrylonitrile materials are distinguished by very good light, wet and rub fastness properties and by a high affinity to the fibre.

The dyestuffs according to the invention can be used individually, in mixtures with one another or in mixtures with other dyestuffs.

The present invention finally also relates to cationically dyeable fibres, tanned cellulose materials, paper, silk, leather, ballpoint pen pastes, writing fluids, stamping fluids and inks for the ink-jet process, which are characterised in that they contain at least one cationic thiadiazolyldiphenylamine dyestuff of the formula (I).

The dyestuffs according to the invention of the formula (I) have low toxicity, in particular for fish and daphniae.

EXAMPLES

EXAMPLE 1

A solution of 17.25 g of sodium nitrite in 30 ml of water was added dropwise to a solution of 46.3 g of N-methyldiphenylamine and 52.2 g of 2-amino-5-diisopropylamino-1,3,4-thiadiazole in 250 ml of glacial acetic acid at 25° C. over a period of 4 hours. After stirring for 2 hours, the product was filtered off with suction, washed with 50% strength by weight acetic acid and water and dried, giving 89.7 g of a dyestuff of the formula

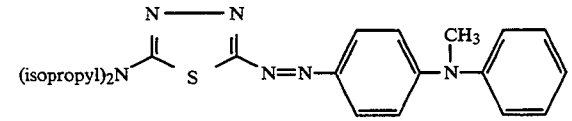

15.8 g of this dyestuff were dissolved in 80 ml of glacial acetic acid and 4 ml of 37% strength by weight hydrochloric acid. 2.8 g of acrylamide were added, and the mixture was stirred at 90° to 95° C. for 2 hours. 2.8 g of acrylamide were then again reacted, and the mixture was stirred at 90° to 95° C. This type of acrylamide addition was repeated until a total of 11.2 g of acrylamide had been introduced. The mixture was then poured into 700 ml of water, and the resulting mixture was filtered. 100 ml of a 2-molar zinc chloride solution in water were added to the filtrate, the product was salted out with a 15% strength by weight aqueous sodium chloride solution, filtered off with suction and dried, giving 15.2 g (68% of theory) of a dyestuff of the formula (I) in which $R^1$ and $R^2$ are isopropyl, $R^3$ is $CH_2CH_2CONH_2$, $R^4$, $R^5$, $R^6$, $R^8$, $R^9$ are hydrogen, $R^7$ is methyl and $X^\ominus$ is ½ $ZnCl_4{}^{2-}$.

The dyestuff exhibited an absorption maximum in 10% strength acetic acid at 604 nm and dyed polyacrylonitrile in a lightfast blue hue.

which was further reacted as crude product.

d) 23.7 g of this dyestuff were stirred in a mixture of 80 ml of glacial acetic acid, 18 ml of acetic anhydride and 8 g of triisopropanolamine together with 18.9 g of dimethyl sulphate at 40° C. for 5 hours. The mixture was then poured into 500 ml of methanol, and a solution of 10 ml of perchloric acid in 200 ml of methanol was added. The product was filtered off with suction, washed with methanol and dried at 40° C. in vacuo, giving 15.4 g of the dyestuff of the formula

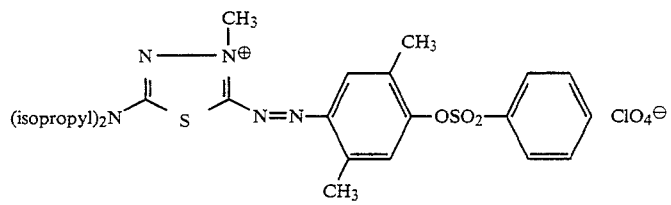

EXAMPLE 2 a) A solution of 51 g of 2-amino-5-diisopropylamino-1,3,4-thiadiazole in 250 ml of water and 225 ml of conc. hydrochloric acid which was mixed with 1 l of ice was swiftly poured into a mixture of 115 ml of 30% strength sodium nitrite solution, 1 l of ice and 250 ml of water at 0° C.

b) 64.8 g of 2,5-dimethylphenol were dissolved in 1.5 l of methanol, and 50 ml of 10% strength sulphamic acid solution in water were added. The mixture was cooled to 5° C. by throwing in ice, the diazotisation batch from a) was then slowly poured in, and 2 l of water were added. The suspension was stirred overnight, filtered off with suction, and the solid was washed neutral with water. Drying at 40° C. in vacuo gave 161 g of the dyestuff of the formula

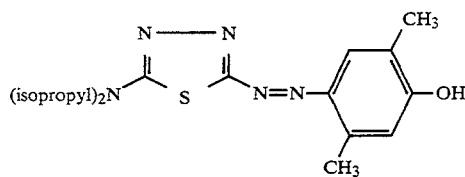

c) 16.7 g of this dyestuff were initially introduced into a mixture of 50 ml of water, 9.6 g of triisopropanolamine and 8 ml of 30% strength sodium hydroxide solution at 0° C., and 13.3 g of benzenesulphonyl chloride were added dropwise over a period of 2 hours. After stirring overnight, the product was filtered off with suction, washed with water and dried at 40° C. in vacuo, giving 23.7 g of the dyestuff of the formula

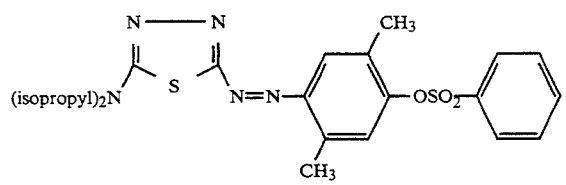

e) 12 g of this dyestuff were stirred in 200 ml of methanol overnight at room temperature together with 4.1 g of aniline. 10 ml of 30% strength aqueous sodium hydroxide solution were added, and the anhydro base of the formula (II) in which $R^1$ and $R^2$ are isopropyl, $R^3$, $R^4$ and $R^6$ are methyl, $R^5$, $R^8$ and $R^9$ are hydrogen, was filtered off with suction, washed with methanol and water and dried at 40° C. in vacuo. The yield was 7.2 g.

Dissolution in aqueous acetic acid gave the dyestuff of the formula (I) in which $R^1$ and $R^2$ are isopropyl, $R^3$, $R^4$ and $R^6$ are methyl $R^5$, $R^7$, $R^8$ and $R^9$ are hydrogen and X− is acetate. This dyestuff had a $\lambda_{max}$ of 600 nm and dyed polyacrylonitrile in a somewhat reddish blue having good lightfastness.

EXAMPLE 3 a–c) Steps a) to c) of Example 2 were repeated, except that 75.6 g of 1-hydroxynaphthalene were used in step b) instead of 2,5-dimethylaminophenol, giving in step c) the dyestuff of the formula

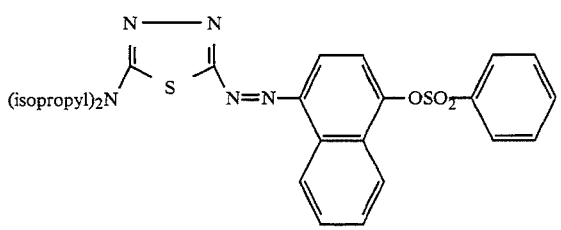

d) 10.2 g of this dyestuff were stirred in a mixture of 40 ml of glacial acetic acid, 10 ml of acetic anhydride 3.8 g of triisopropanolamine together with 7.9 g of dimethyl sulphate at 50° C. for 2.5 hours. The mixture was poured onto 100 g of ice and 100 ml of water. 5 g of zinc chloride and 5 g of sodium chloride were added. The product was filtered off with suction, washed with a mixture of methanol and ice-water and dried at 40° C. in vacuo, giving 12.6 g of the dyestuff of the formula

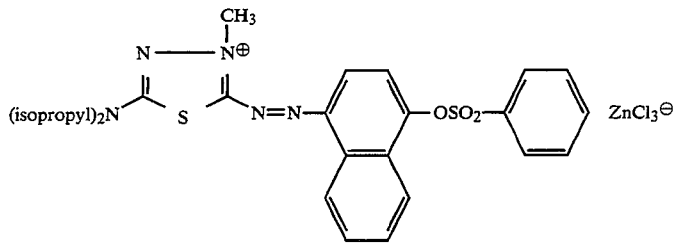

e) 6.7 g of o-anisidine were added to 12.5 g of this dyestuff in 300 ml of methanol, and the mixture was stirred overnight at room temperature. The product was filtered off with suction, washed with methanol and water and dried at 40° C. in vacuo, giving 8.3 g of the dyestuff of the formula (I) in which $R^1$ and $R^2$ are isopropyl, $R^3$ is methyl, $R^5$ and $R^6$ together are —CH=CH—CH=CH—, $R^9$ is methoxy, $R^4$, $R^7$ and $R^8$ are hydrogen and $X^-$ is $ZnCl_3^-$.

It has a $\lambda_{max}$ of 643 nm and dyes polyacrylonitrile greenish blue.

The dyestuffs compiled in the table below were obtained analogously to Examples 1 to 3. The dyestuffs had the formula (I), the substituents having the meaning given for each example.

TABLE

| Example No. | $R^1$ | $R_2$ | $R^3$ | $R^4$ | $R^5$ | $R^6$ | $R^7$ | $R^8$ | $R^9$ | $X^\ominus$ | $\lambda_{max}$ (nm) | prepared analogously to Example |
|---|---|---|---|---|---|---|---|---|---|---|---|---|
| 4 | (isopropyl)$_2$ | | CH$_3$ | H | H | H | H | H | H | ZnCl$_3^\ominus$ | 596 | 1 |
| 5 | " | | " | H | H | H | H | OC$_2$H$_5$ | H | " | 605 | 1 |
| 6 | " | | " | OCH$_3$ | H | H | H | H | H | CH$_3$OSO$_3^\ominus$ | 610 | 2 |
| 7 | " | | " | OCH$_3$ | H | OCH$_3$ | H | CH$_3$ | H | Cl$^\ominus$ | 589 | 2 |
| 8 | " | | " | OCH$_3$ | H | CH$_3$ | H | Cl | H | Cl$^\ominus$ | 592 | 2 |
| 9 | " | | " | OCH$_3$ | H | Cl | H | H | H | Cl$^\ominus$ | 624 | 2 |
| 10 | " | | " | OCH$_3$ | H | NHC$_6$H$_5$ | H | H | H | Cl$^\ominus$ | 594 | 2 |
| 11 | " | | " | CH$_3$ | CH$_3$ | H | CH$_2$CH$_2$CN | H | NO$_2$ | CH$_3$OSO$_3^\ominus$ | 581 | 1 |
| 12 | " | | " | H | H | H | CH$_3$ | H | H | CH$_3$OSO$_3^\ominus$ | 595 | 1 |
| 13 | " | | " | H | −CH=CH−CH=CH− | | H | H | H | CH$_3$OSO$_3^\ominus$ | 588 | 1 |
| 14 | " | | " | H | −CH=CH−CH=CH− | | H | H | OH | ZnCl$_3^\ominus$ | 598 | 3 |
| 15 | " | | " | H | −CH=CH−CH=CH− | | H | H | CH$_3$ | CH$_3$COO$^\ominus$ | 642 | 3 |
| 16 | " | | " | H | −CH=CH−CH=CH− | | CH$_3$ | H | H | CH$_3$COO$^\ominus$ | 647 | 3 |
| 17 | (isopropyl)$_2$ | | CH$_3$ | CH$_3$ | H | H | H | CH$_3$ | H | ZnCl$_3^\ominus$ | 640 | 3 |
| 18 | " | | " | OCH$_3$ | H | H | H | OCH$_3$ | H | ZnCl$_3^\ominus$ | 647 | 3 |
| 19 | " | | " | H | H | CN | H | H | Cl | ZnCl$_3^\ominus$ | 640 | 3 |
| 20 | " | | " | CH$_3$ | H | CH$_3$ | H | H | H | CH$_3$OSO$_3^\ominus$ | 610 | 2 |
| 21 | " | | " | OCH$_3$ | H | H | H | H | NHCOCH$_3$ | ZnCl$_3^\ominus$ | 592 | 2 |
| 22 | " | | " | −CH$_2$−CHCH$_3$ | | H | | H | H | Br$^\ominus$ | 605 | 1 |
| 23 | " | | " | " | H | H | CH$_2$CH$_2$CN | H | H | CH$_3$OSO$_3^\ominus$ | 554 | 1 |
| 24 | " | CH$_3$ | CH$_3$ | OC$_2$H$_5$ | H | H | H | H | CN | CH$_3$OSO$_3^\ominus$ | 606 | 2 |
| 25 | " | CH$_3$ | CH$_2$CH$_2$CN | CH$_3$ | H | CH$_3$ | CH$_2$CH$_2$OH | OCH$_3$ | H | CH$_3$OSO$_3^\ominus$ | 590 | 1 |
| 26 | CH$_2$CH$_2$CN | | CH$_3$ | CH$_3$ | H | COOCH$_3$ | H | H | OCH$_3$ | CH$_3$OSO$_3^\ominus$ | 605 | 2 |
| 27 | | | CH$_2$CHCH$_3$−OH | H | H | H | C$_2$H$_5$ | OC$_2$H$_5$ | H | Cl$^\ominus$ | 592 | 1 |
| 28 | CH$_2$CH$_2$CN | CH$_3$ | | H | H | H | H | H | H | ZnCl$_3^\ominus$ | 603 | 1 |
| 29 | | | CH$_3$ | OCH$_3$ | H | H | CH$_2$CH$_2$OH | H | NO$_2$ | CH$_3$OSO$_3^\ominus$ | 580 | 1 |
| 30 | | (cyclohexyl-CH$_3$) | CH$_3$ | H | H | H | H | H | H | CH$_3$OSO$_3^\ominus$ | 607 | 1 |
| 31 | " | " | CH$_2$−C$_6$H$_5$ | H | H | H | H | CH$_3$ | H | Br$^\ominus$ | 590 | 1 |
| 32 | " | CH$_2$CH$_2$CN | C$_4$H$_9$ | H | H | H | H | H | NO$_2$ | Br$^\ominus$ | 573 | 1 |
| 33 | " | CH$_2$CH$_2$CN | CH$_3$ | H | H | F | CH$_2$−C$_6$H$_5$ | CH$_3$ | H | CH$_3$OSO$_3^\ominus$ | 582 | 1 |
| 34 | CH$_2$CHCH$_3$−OH | CH$_2$CHCH$_3$−OH | C$_2$H$_5$ | H | −CH=CH−CH=CH− | | CH$_3$ | H | H | ZnCl$_3^\ominus$ | 640 | 3 |

TABLE-continued

| Example No. | $R_1$ | $R_2$ | $R^3$ | $R^4$ | $R^5$ | $R^6$ | $R^7$ | $R^8$ | $R^9$ | $X^\ominus$ | $\lambda_{max}$ (nm) | prepared analogously to Example |
|---|---|---|---|---|---|---|---|---|---|---|---|---|
| 35 | $CH_2CHCH_3$ \| $OH$ | $CH_2CHCH_3$ \| $OH$ | $CH_3$ | $CH(CH_3)$—$CH_2$—$C(CH_3)_2$ | H | H | | H | H | $CH_3OSO_3^\ominus$ | 600 | 1 |
| 36 | $CH_2CHCH_3$ \| $OH$ | $CH_2CHCH_3$ \| $OH$ | $CH_3$ | | H | H | $CH_2CH_2OH$ | H | H | $CH_3OSO_3^\ominus$ | 555 | 1 |
| 37 | $CH_2CH_2OH$ | 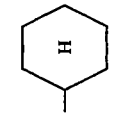 | $CH_2CH_2CN$ | $OCH_3$ | H | Cl | $CH_3$ | H | H | $ZnCl_3^\ominus$ | 627 | 2 |
| 38 | $-CH_2CH_2-O-CH_2CH_2-$ | | $CH_3$ | H | H | H | H | H | H | $C_6H_5SO_3^\ominus$ | 588 | 1 |
| 39 | $-CH_2CH_2-O-CH_2CH_2-$ | | $CH_3CH_2OH$ | $OCH_3$ | $-CH=CH-CH=CH-$ | | H | H | $CH_3$ | H | $ZnCl_3^\ominus$ | 642 | 3 |
| 40 | $-CH_2CH_2-O-CH_2CH_2-$ | | $CH_2-CH=CH_2$ | $OCH_3$ | H | $CH_3$ | H | $CH_3$ | H | $Br^\ominus$ | 585 | 2 |
| 41 | $-(CH_2)_4-$ | | $CH_2CH_2CN$ | $OCH_3$ | H | H | $CH_2CH_2CN$ | H | H | $ZnCl_3^\ominus$ | 590 | 1 |
| 42 | $-CH_2CH_2-N-CH_2CH_2-$ \| $CH_2CH_2OH$ | | $CH_3$ | H | H | H | $C_2H_5$ | H | H | $ZnCl_3^\ominus$ | 600 | 1 |
| 43 | 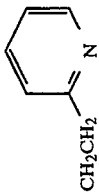 | H | $CH_3$ | H | $-CH=CH-CH=CH-$ | | H | H | H | $ZnCl_3^\ominus$ | 640 | 2 |
| 44 | $CH_2C_6H_5$ | H | $CH_2CHCH_3$ \| $OH$ | H | H | $OH$ | $CH_3$ \| $O$ | $CH_3$ | $CH_3$ | $ZnCl_3^\ominus$ | 585 | 2 |
| 45 | $CH_2CH_2OH$ | $CH_2CH_2OH$ | $CH_2CH_2COOCH_3$ | H | H | H | | H | | $ZnCl_3^\ominus$ | 575 | 1 |
| 46 | $CH_2CH_2Cl$ | $CH_3$ | $CH_2CH_2CONH_2$ | H | H | H | $CH_2C_6H_5$ | $OCH_3$ | H | $ZnCl_3^\ominus$ | 602 | 1 |
| 47 | $CH_3CH_2$—[pyridin-2-yl] | $CH_3$ | $CH_3$ | H | H | H | $CH_2CH_2CONH_2$ | H | H | $CH_3OSO_3^\ominus$ | 590 | 1 |

TABLE-continued

| Example No. | R¹ | R² | R³ | R⁴ | R⁵ | R⁶ | R⁷ | R⁸ | R⁹ | X⊖ | $\lambda_{max}$ (nm) | prepared analogously to Example |
|---|---|---|---|---|---|---|---|---|---|---|---|---|
| 48 | CH₃ | CH₃ |  | H | H | H | CH₃ | OC₂H₅ | H | Cl⊖ | 607 | 1 |
| 49 | CH₃ | CH₃ | CH₂CH₂CONH₂ | H | H | CF₃ | H | H | H | ZnCl₃⊖ | 600 | 1 |
| 50 | CH₃ | CH₃ | CH₂CHCH₃<br>OH | H | H | NO₂ | H | OCH₃ | H | ZnCl₃⊖ | 600 | 1 |
| 51 | CH₂CH₂CN | H | CH₂CH₂OCH₃ | OCH₃ | OCH₃ | H | H | H | H | ZnCl₃⊖ | 615 | 2 |
| 52 | —(CH₂)₅— | | CH₂CH₂CONH₂ | H | H | OC₆H₅ | C₆H₅ | H | H | Cl⊖ | 622 | 1 |
| 53 | CH₂CH₂OCH₃ | CH₃ | CH₃ | OCH₃ | H | —CH=CH—CH=CH— | H | H | H | CH₃OSO₃⊖ | 585 | 3 |
| 54 | CH₂CH₂COOCH₃ | CH₃ | CH₃ | H | H | | C₂H₅ | H | OCH₃ | ZnCl₃⊖ | 645 | |

EXAMPLE 55

Dyeing Procedure for Polyacrylonitrile 0.1 g of the dyestuff obtained according to Example 8 was made into a paste with 2 ml of water and the addition of a small amount of acetic acid, and the paste was dissolved using 50 ml of hot water. 1.2 g of a naphthalenesulphonic acid/formaldehyde condensation product were added, and the mixture was made up to 500 ml with cold water.

The pH of this dye liquor was brought to 4.5–5 with acetic acid and sodium acetate. 10 g of a piece fabric consisting of polyacrylonitrile fibres were constantly agitated in this dye liquor, while the temperature was increased to 100° C. over a period of 30 minutes. Dyeing was carried out at the boiling temperature for 60 minutes, the material was then rinsed with cold water and dried at 60°–70° C. The material had then been dyed in a intensely reddish blue.

EXAMPLE 56

Colouring Procedure for Paper Containing Wood Pulp

In a Hollander beater dry pulp consisting of 60% of wood pulp and 40% of unbleached sulphite pulp was beaten up with sufficient water and ground to a degree of freeness of 40° SR such that the dry solids content was a little above 2.5%. The thickened pulp was then brought to a dry solids content of exactly 2.5% with water. 5 g of a 0.5% strength by weight aqueous solution of the dyestuff from Example 4 were added to 200 g of this thickened pulp, the mixture was stirred for 5 min, 2% of resin size and 4% of alum, relative to the dry pulp, were added, and the mixture was again stirred for a few minutes until a homogeneous mixture was obtained. The mass was then diluted to 700 ml with water, and sheets of paper were produced therefrom in a known manner by passing it over a sheet former with suction. They exhibited an intense blue coloration.

The other dyestuffs from Examples 1 to 54 can also be used for colouring analogously to Examples 55 and 56.

What is claimed is:

1. A cationic thiadiazolyldiphenylamine dyestuff of the formula (I)

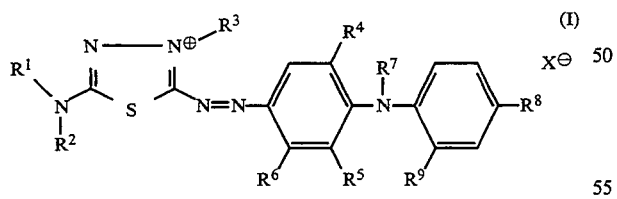

in which
R$^1$ and R$^2$, independently of one another, denote hydrogen, alkyl, alkenyl, cycloalkyl, aralkyl or a heterocycle, or R$^1$ and R$^2$ together with the nitrogen atom to which they are bound form a heterocycle,
R$^3$ denotes alkyl, alkenyl, cycloalkyl or aralkyl,
R$^4$ and R$^5$, independently of one another, denote hydrogen, alkyl, alkoxy or halogen,
R$^6$ denotes hydrogen, alkyl, alkoxy, aryloxy, arylamino, halogen, cyano, alkoxycarbonyl or nitro, or
R$^5$ and R$^6$ together form a —CH=CH—CH=CH— bridge,
R$^7$ denotes hydrogen, alkyl, cycloalkyl, alkenyl, aralkyl or aryl,
R$^8$ and R$^9$, independently of one another, denote hydrogen, alkyl, alkoxy, aryloxy, halogen, cyano, alkoxycarbonyl, nitro or C$_1$–C$_4$-acylamino, or
R$^4$ and R$^7$ form a 2- or 3-membered carbon bridge which is unsubstituted or substituted by 1 to 3 alkyl groups, or
R$^4$ and R$^9$ form a direct bond or an oxygen bridge, and
X$^\ominus$ denotes an anion, said heterocycle being defined as a thienyl, furyl or pyridyl radical, said alkyl, alkenyl, cycloalkyl, aralkyl, aryl, alkoxy and heterocyclic radicals being unsubstituted or substituted by cyano, hydroxyl, fluorine, chlorine, bromine, nitro, alkyl, monoalkylamino, dialkylamino, alkoxy, phenyl, acyloxy, acylamino, alkoxycarbonyl, alkoxycarbonyloxy, carboxyl groups, ammonium groups or pyridinium groups.

2. A cationic thiadiazolyldiphenylamine dyestuff according to claim 1 in which at least one of the radicals R$^4$, R$^5$, R$^6$, R$^8$ and R$^9$ is not hydrogen or R$^5$ and R$^6$ together form a —CH=CH—CH=CH— bridge.

3. A cationic thiadiazolyldiphenylamine dyestuff according to claim 1 in which in formula (I)
R$^2$ denotes hydrogen, or
R$^1$ and R$^2$, independently of one another, each denotes a C$_1$–C$_8$-alkyl radical which is unsubstituted or substituted by hydroxyl, halogen, cyano, C$_1$–C$_4$-alkoxy, aminocarbonyl or C$_1$–C$_4$-alkoxycarbonyl, or denotes allyl, cyclopentyl, cyclohexyl, a benzyl or phenethyl radical which is unsubstituted or substituted by halogen, cyano, C$_1$–C$_4$-alkyl or C$_1$–C$_4$-alkoxy, or denotes a 1,1-dioxotetrahydrothienyl radical, tetrahydrofurylmethyl, pyridylmethyl or pyridylethyl radical, or
R$^1$ and R$^2$ together with the nitrogen atom to which they are bound denote a pyrrolidino, piperidino or morpholino radical which is unsubstituted or substituted by up to 4 methyl groups or denote a piperazino radical which is unsubstituted or substituted on nitrogen by methyl, ethyl, hydroxyethyl or aminoethyl,
R$^3$ denotes C$_1$–C$_4$-alkyl which is unsubstituted or substituted by hydroxyl, halogen, cyano, C$_1$–C$_4$-alkoxy, aminocarbonyl or C$_1$–C$_4$-alkoxycarbonyl, or denotes allyl or a benzyl or phenethyl radical which is unsubstituted or substituted by halogen, C$_1$–C$_4$-alkyl or C$_1$–C$_4$-alkoxy,
R$^4$ and R$^5$, independently of one another, denote hydrogen, C$_1$–C$_4$-alkyl, C$_1$–C$_4$-alkoxy or halogen,
R$^6$ denotes hydrogen, C$_1$–C$_4$-alkyl, C$_1$–C$_4$-aryloxy, C$_6$–C$_{10}$-arylamino, halogen, cyano, C$_1$–C$_4$-alkoxycarbonyl or nitro, or
R$^5$ and R$^6$ together form a —CH=CH—CH=CH— bridge,
R$^7$ denotes hydrogen, C$_1$–C$_4$-alkyl which is unsubstituted or substituted by hydroxyl, halogen, cyano, C$_1$–C$_4$-alkoxy, aminocarbonyl or C$_1$–C$_4$-alkoxycarbonyl, or denotes allyl, cyclopentyl, cyclohexyl or a benzyl, phenethyl or phenyl radical, which is unsubstituted or substituted by halogen, C$_1$–C$_4$-alkyl or C$_1$–C$_4$-alkoxy,
R$^8$ and R$^9$, independently of one another, each denotes hydrogen, C$_1$–C$_4$-alkyl which is unsubstituted or substituted by hydroxyl, halogen, cyano or $C_1$–$C_4$-alkoxy, or denotes $C_1$–$C_4$-alkoxy, $C_6$–$C_{10}$-aryloxy, halogen, cyano, $C_1$–$C_4$-alkoxycarbonyl, nitro or $C_1$–$C_4$-alkanoylamino, or $R^4$ together with $R^7$ form a 2- or 3-membered carbon bridge which may be unsubstituted or substituted by 1 to 3 methyl or ethyl groups, or $R^4$ together with $R^9$ form a direct bond or an oxygen bridge, and $X^\ominus$ denotes an anion.

4. A cationic thiadiazolyldiphenylamine dyestuff according to claim 1 in which in formula (I)

$R^2$ denotes hydrogen, or $R^1$ and $R^2$, independently of one another, denote methyl, ethyl, propyl, butyl, methylpropyl, pentyl, methylbutyl, dimethylpropyl, hexyl, hydroxyethyl, hydroxypropyl, chloroethyl, cyanomethyl, cyanoethyl, cyanopropyl, methoxyethyl, ethoxyethyl, methoxypropyl, aminocarbonylmethyl, aminocarbonylethyl, methoxycarbonylmethyl, methoxycarbonylethyl, allyl, cyclohexyl, benzyl, phenethyl, methylbenzyl, chlorobenzyl, methoxybenzyl, 1,1-dioxotetrahydrothienyl, furfuryl, 2- or 4-pyridylmethyl or 2- or 4-pyridylethyl, or $R^1$ and $R^2$ together with the nitrogen atom to which they are bound denote pyrrolidino, piperidino, piperazino or morpholino which is unsubstituted or substituted on nitrogen by methyl, ethyl, hydroxyethyl or aminoethyl, $R^3$ denotes methyl, ethyl, propyl, butyl, hydroxyethyl, hydroxypropyl, hydroxybutyl, chloroethyl, cyanomethyl, cyanoethyl, cyanopropyl, methoxyethyl, ethoxyethyl, methoxypropyl, aminocarbonylethyl, methoxycarbonylethyl, ethoxycarbonylethyl, allyl, benzyl, phenethyl, methylbenzyl, chlorobenzyl or methoxybenzyl, $R^4$ and $R^5$, independently of one another, denote hydrogen, methyl, ethyl, methoxy, ethoxy or chlorine, $R^5$ and $R^6$ together form a —CH=CH—CH=CH bridge, $R^6$ denotes hydrogen, methyl, ethyl, methoxy, ethoxy, phenoxy, anilino, fluorine, chlorine, bromine, cyano, methoxycarbonyl, ethoxycarbonyl or nitro, or $R^7$ denotes hydrogen, methyl, ethyl, propyl, butyl, hydroxyethyl, hydroxypropyl, chloroethyl, cyanomethyl, cyanoethyl, cyanopropyl, methoxyethyl, ethoxyethyl, aminocarbonylethyl, methoxycarbonylethyl, ethoxycarbonylethyl, allyl, benzyl, phenethyl, methylbenzyl, phenyl, chlorophenyl, methylphenyl or methoxyphenyl, $R^8$ and $R^9$, independently of one another, denote hydrogen, methyl, ethyl, methoxy, ethoxy, phenoxy, chlorine, cyano, methoxycarbonyl, nitro, acetylamino or propionylamino, or $R^4$ together with $R^7$ denote a —CH$_2$—CH$_2$—, —CH$_2$—CH$_2$—CH$_2$—, —CH$_2$—CH(CH$_3$)— or —CH(CH$_3$)—CH$_2$—C(CH$_3$)$_2$— bridge, or $R^4$ together with $R^9$ denote a direct bond or an oxygen bridge, and $X^\ominus$ denotes an anion.

5. A cationic thiadiazolyldiphenylamine dyestuff according to claim 1 in which in formula (I)

$R^1$ and $R^2$, independently of one another, denote methyl, ethyl, propyl, butyl, hydroxyethyl, hydroxypropyl, cyanoethyl, methoxyethyl or ethoxyethyl, or $R^1$ and $R^2$ together with the nitrogen atom to which they are bound denote morpholino, $R^3$ denotes methyl, ethyl, hydroxyethyl, hydroxypropyl or cyanoethyl, $R^4$ denotes methyl, methoxy, ethoxy or chlorine, $R^5$ denotes hydrogen, $R^6$ denotes hydrogen, methyl, chlorine, methoxy or cyano, or $R^5$ and $R^6$ together form a —CH=CH—CH=CH— bridge, $R^7$ denotes hydrogen, methyl, hydroxyethyl, hydroxypropyl, cyanoethyl, $R^8$ and $R^9$, independently of one another, denote hydrogen, methyl, methoxy, chlorine, cyano, nitro or acetylamino, and $X^\ominus$ denotes an anion.

6. A cationic thiadiazolyldiphenylamine dyestuff according to claim 5 in which $R^7$ denotes hydrogen.

7. An anhydro base of formula (II)

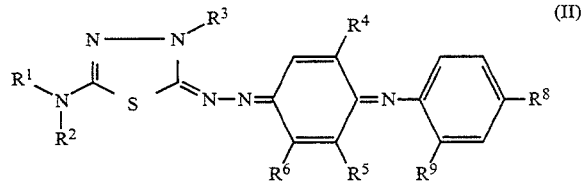

in which $R^1$ to $R^6$, $R^8$ and $R^9$ have the meaning given in claim 1.

* * * * *